Dec. 27, 1932.  J. H. GOULD  1,891,977
AIRPLANE STRUT CONSTRUCTION
Filed May 6, 1929
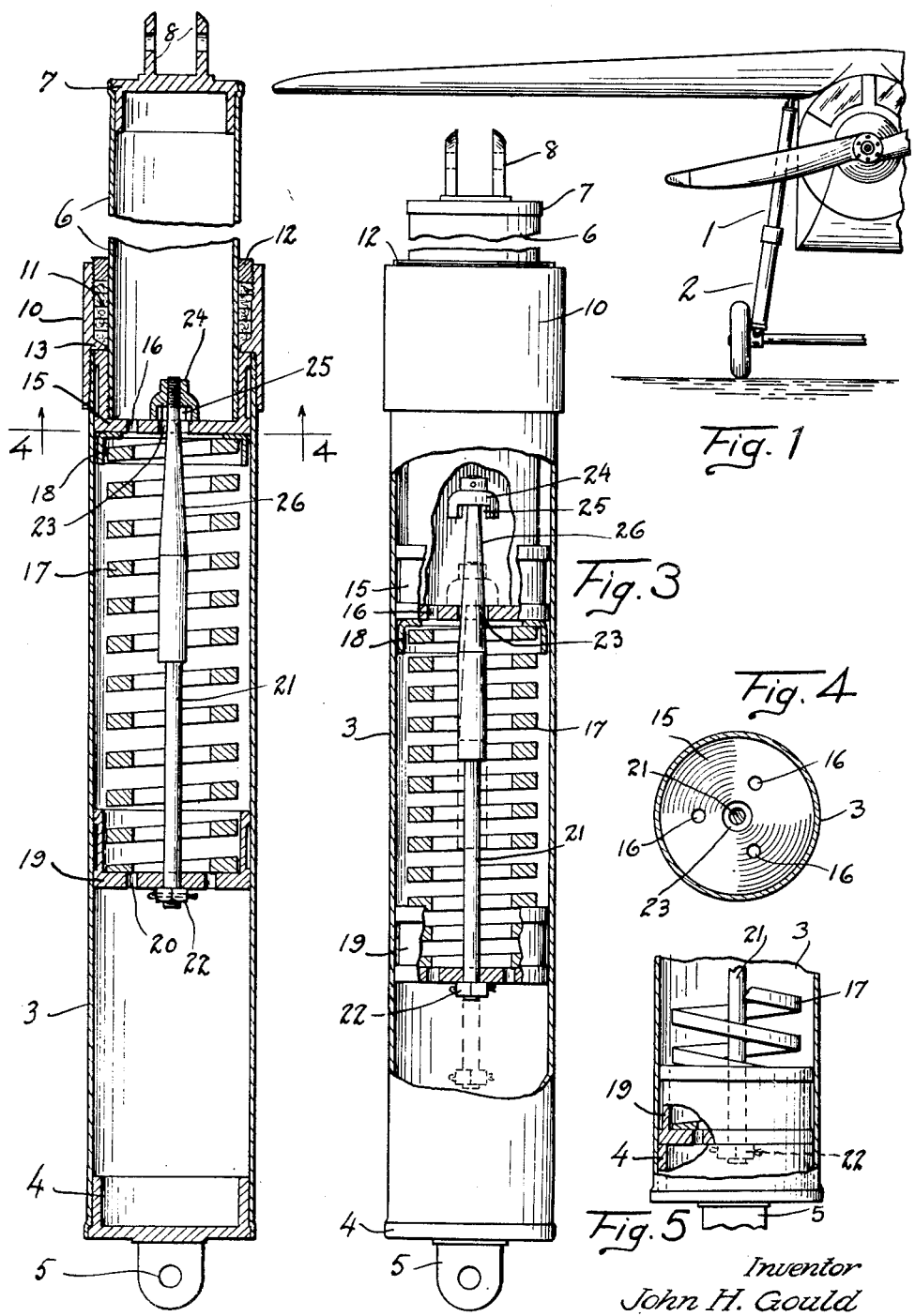
Inventor
John H. Gould
BY
Stuart C Barnes
ATTORNEY.

Patented Dec. 27, 1932

1,891,977

UNITED STATES PATENT OFFICE

JOHN H. GOULD, OF DETROIT, MICHIGAN, ASSIGNOR TO AIRCRAFT PRODUCTS CORPORATION OF AMERICA, OF DETROIT, MICHIGAN, A CORPORATION OF MICHIGAN

AIRPLANE STRUT CONSTRUCTION

Application filed May 6, 1929. Serial No. 360,848.

This invention relates to airplane strut construction. It has to do particularly with strut construction which connects the landing gear and the fuselage of a plane.

The principal object of the invention is to provide a strut construction designed to absorb the shock or shocks incident to the landing of the plane, and to also resiliently support the fuselage as the plane is taxied. Such strut construction has been heretofore proposed but the construction of the present invention is such as to effect materially better results.

Heretofore it has been proposed to construct a shock absorbing unit in a strut wherein the initial impact or several impacts incidental to landing, are met with a hydraulic shock absorbing action, and after landing the fuselage was resiliently supported upon a spring or springs. It has been found, however, that this hydraulic resistance to the landing impacts does not give sufficient resilient action especially where the impact is sudden, as when the plane loses its speed for maintaining it in the air while yet a distance above the ground, with the result that the plane "pancakes" or drops suddenly upon the ground. The fluid body of the hydraulic resistance means cannot flow through the valves provided therefore with sufficient rapidity to effect sufficient resilience, and accordingly, upon the initial impact, does not permit a sufficient movement of the relatively movable parts of the shock absorbing structure.

In accordance with the present invention, a shock absorbing construction is provided wherein the combined action of a hydraulic shock absorbing arrangement and a spring is utilized for the initial landing impacts therein, and wherein the spring is so disposed that it is also utilized as a spring suspension from the fuselage when the plane is taxied.

In the drawing:

Fig. 1 is a front view of a portion of an airplane, illustrating in a more or less diagrammatic form an arrangement of a strut construction of a plane.

Fig. 2 is a sectional view taken through a shock absorbing unit of the strut, showing the parts in normal position which they assume and in which position the parts are in when the landing gear is freed of weight.

Fig. 3 is a view similar to Fig. 2, being only partly in section and with parts cut away in illustration of a position the parts may take after initial impact.

Fig. 4 is a plan view of one of the members illustrating the passageways for the fluid.

Fig. 5 is a sectional view illustrating the position of the spring and associated parts when the plane is taxied.

In the accompanying drawing, the strut of a plane is generally referenced 1, which struct connects the fuselage with the landing gear, and this strut has a shock absorbing unit therein as generally referenced 2.

A shock absorbing unit consists of a cylinder 3 closed at its lower end as at 4, and provided with a suitable device for attachment to the running gear as for instance, the eye 5.

Another cylinder 6 telescopes within the first and its upper end is closed as at 7, and provided with a suitable device for attachment to the fuselage or to the part of the plane as for instance the eyes 8. A suitable packing joint is provided at the point where the one cylinder enters the other, the same being in the form of a ring or coupling 10 which may be screw threaded to the cylinder 3 and which slidably engages cylinder 6. Suitable packing 11 is disposed in the packing joint and the packing may be held tightly in place by a ring 12. The sleeve 10 may have a circumferential shoulder 13 adapted to abut against the upper end of the cylinder 3.

The lower end of cylinder 6 is closed off by a suitable head 15, which may be screw threaded on the cylinder as shown, and which has a number of apertures 16 for the passage therethrough of the fluid, such as oil, which is used for the hydraulic shock absorbing action.

Positioned below the head 15 is a coiled spring 17 having at its upper end a spring retainer 18 adapted to abut against the head 15 and at its lower end having a retainer 19 in the form of a piston, the head of which has suitable apertures 19 for the passage of the fluid.

The head 15 and piston 20 are connected in such a way as to limit movement away from each other, but still to permit movement toward each other. This connection may take the form of a bolt 21 which extends through the piston 20 and which may have a suitable nut 22 on its end. The upper end of the bolt extends through an aperture 23 in the head 15 and has fixed to its upper end a suitable nut 24. The aperture 23 is of a size larger than the portion of the bolt which normally lies in this aperture so that the aperture also acts as a valve or passageway for the fluid, and the nut 24 is in the nature of a castle nut so that it does not seal against the upper surface of the head 15 but affords passageways 25 so that fluid coming through the opening 23 may pass through the openings in the nut.

The body of the bolt 21 is frusto-conical in shape for at least a portion of the length as illustrated at 26 and this portion functions in connection with the aperture 23 to provide a variable valve action for the passage of the fluid through the passageway.

In the operation of this construction, a quantity of suitable fluid for effecting the hydraulic shock absorbing action is to be placed in the cylinders and such fluid may be oil, suitable for the purpoe. The quantity of fluid is such as to at least fill the cylinder 3 up to the level of the uppermost position of the head 15, it being essential that all the space below the normal position of the head 15 be filled with oil although the oil may even rise above the head 15.

Accordingly when the plane is in the air, the landing gear is held suspended by the struts and the two telescopic cylinders are pulled out to the extreme limit as illustrated in Fig. 2.

Assume now that the plane lands, and the landing gear comes into contact with the ground and supports the plane, thus effecting a compression of the struts. In the initial compressive force caused by landing impact, and indeed in some of the subsequent impacts, the cylinder 6 is urged downwardly into the cylinder 3. At this point we call attention to the fact that the head 15 has apertures of sufficient size or in sufficient numbers to permit the passage of oil therethrough more readily as the same passes through the piston 19. As shown in Fig. 2, the piston 19 has two apertures, while the head 15 has three. Also oil can pass through the head 15 by flowing through apertures 23 and 25. The result of this is that downward impact of cylinder 6 forces the head 15 downward with the oil passing through it. Inasmuch as the oil passes through the head 15 much more readily than it does through piston 19, the head 15 moves downward and compresses the spring 17. In other words, while the head 19 will have a downward movement, yet it is not so great as that of the head 15 and accordingly the spring 17 is backed up so to speak, by a cushion of oil. Thus there is a double action which materially aids in absorbing the shocks of initial landing. It is that of a resiliency effected by a spring which is in turn backed up by a cushion of oil. The cylinder 6 may be air tight so that when oil is forced into it air therein will be compressed thus affording an air cushion.

One position which the parts may assume after impact has been received, is shown in Fig. 2 wherein it will be noted that although the piston 19 is moved downward, the head 15 is moved downwardly to a greater degree, this being cushioned by the spring 17. At this point the controlling feature of the frusto-conical portion of the bolt in association with the opening 23 may be brought out. Due, perhaps partially to the inertia of the bolt, and partially to resistance of the oil, the head 15 moves down away from the nut 24 and in this action the frusto-conical part 26 acts to progressively diminish the size of opening 23 thus progressively closing off the freedom of the passage of oil through that head. The result of this is a gradual increase in resistance. In the beginning of the impact, the resistance of the oil upon head 15 is relatively small but as it moves down as a consequence of the impact, the valve action gradually increases the resistance and so slows up a downward movement of the head 15 gradually, and accordingly there is no sudden impact.

After the plane is supported for a short while by the landing gear, practically all the oil passes through the piston 19 with the result that piston and the spring settle down and rest upon the lower portion of the cylinder 3, as for instance, on the shoulder of the head 4, and now as the plane is taxied across the field, it is resiliently supported by the spring.

Claims:

1. In an airplane strut construction, the combination of a cylinder associated with the landing gear, a second cylinder associated with the plane body with the two cylinders telescopingly arranged, a spring attached to the second cylinder and disposed within the first, a piston in said first cylinder positioned adjacent one end of the spring, said first named cylinder having a quantity of fluid therein which backs the said spring and piston, said piston having a port therethrough for the passage of oil whereby, in landing impact, the plane is resiliently supported by action of the spring and by bodily movement of the spring by passage of said oil through the said port.

2. In an airplane strut construction, the combination of a cylinder associated with the landing gear, a second cylinder associated with the body of the plane and telescoping within the first cylinder, a head for closing the lower end of the second named cylinder, a spring depending from said head, a piston associated with the lower end of the spring and positioned within the first cylinder, said first named cylinder having a quantity of liquid therein which backs up the piston, said piston having a port therethrough for the passage of the fluid, whereby landing impact is dissipated by compression of said spring and the fluid cushion afforded by the said fluid in passing through the said port in the piston.

3. In an airplane strut construction, the combination of a cylinder associated with the landing gear, a second cylinder telescopingly engaging the first which is associated with the plane body, a head for closing one end of the second named cylinder, a spring depending therefrom, a piston associated with the opposite end of the spring, said first named cylinder having a quantity of oil therein which backs up the head and piston, said head and piston having each a port therethrough for the passage of the fluid, with the port in the head having an area larger than the port in the piston.

4. In an airplane strut construction, the combination of a cylinder associated with the landing gear, a second cylinder telescopingly engaging the first which is associated with the plane body, a head for closing one end of the second cylinder, a spring depending therefrom, a piston associated with the opposite end of the spring, said first named cylinder having a quantity of oil therein which backs up the head and piston, said head and piston each having one or more ports therethrough for the passage of the fluid, with the ports in the head having an area larger than the ports in the piston, and means for progressively diminishing the size of the ports in the head as the said head telescopes with in the first mentioned cylinder incident to landing impact.

5. In an airplane struct construction, the combination of a cylinder associated with a landing gear, a second cylinder associated with the plane body and telescoping within the first, a head for closing one end of the second named cylinder, a bolt depending from said head, a piston on the lower end of the bolt, a spring disposed between the piston and head, said first named cylinder having a quantity of oil therein which backs up the said piston and head, said piston and head having each at least one oil passageway therethrough with the passageway in the head having an area greater than the passageways in the piston, whereby, upon initial impact, the head and piston have a relative movement toward each other which is resisted by the spring, and the piston, and the spring as a whole have a movement with respect to the first mentioned cylinder.

6. In an airplane strut construction, the combination of a cylinder associated with the landing gear, a second cylinder associated with the plane body and telescoping within the first, a head for closing one end of the second named cylinder, a bolt depending from said head, a piston on the lower end of the bolt, a spring disposed between the piston and head, said first named cylinder having a quantity of oil therein which backs up the said piston and head, said piston and head having each an oil passageway therethrough with the passageway in the head having an area greater than the passageway in the piston, whereby, upon initial impact, the head and piston have a relative movement toward each other which is resisted by the spring, and the piston and spring as a whole have a movement with respect to the first mentioned cylinder, said bolt being slidably received in a passageway in the said head, and said bolt having a frustoconical shaped portion arranged to progressively diminish said passageway as the head and piston move toward each other.

In testimony whereof I affix my signature.

JOHN H. GOULD.